United States Patent
Rönneke

(10) Patent No.: US 6,515,989 B1
(45) Date of Patent: Feb. 4, 2003

(54) COLLECTING PER-PACKET BILLING DATA IN A PACKET DATA SERVICE

(75) Inventor: Hans Rönneke, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/218,619

(22) Filed: Dec. 22, 1998

(51) Int. Cl.[7] .............................................. H04L 12/28
(52) U.S. Cl. ...................................... 370/389; 370/401
(58) Field of Search ................................ 370/338, 401, 370/389, 402, 403, 404, 397, 351, 352, 392, 464, 465, 353; 379/111, 114, 112, 126, 127, 137; 455/404–408

(56) References Cited

U.S. PATENT DOCUMENTS

| | | | |
|---|---|---|---|
| 5,533,019 A | | 7/1996 | Jayapalan |
| 5,764,899 A | * | 6/1998 | Eggleston .................... 709/203 |
| 5,844,973 A | * | 12/1998 | Ventrakaman ............... 379/127 |
| 5,958,006 A | * | 9/1999 | Eggleston .................... 709/219 |
| 5,970,059 A | * | 10/1999 | Ahopelto ..................... 370/338 |
| 6,101,531 A | * | 8/2000 | Eggleston .................... 709/206 |
| 6,141,404 A | * | 10/2000 | Westerlage .................. 379/118 |
| 6,188,752 B1 | * | 2/2001 | Lesley ......................... 379/114 |
| 6,333,976 B2 | * | 12/2001 | Lesley .................... 379/114.01 |

FOREIGN PATENT DOCUMENTS

| | | |
|---|---|---|
| EP | 0837578 | 4/1998 |
| WO | 9726739 | 7/1997 |

* cited by examiner

*Primary Examiner*—Douglas Olms
*Assistant Examiner*—Richardo M. Pizarro

(57) ABSTRACT

Per-packet billing for a packet data network, mobile or fixed, is provided by retrieving and processing all packets transported at a physical layer of the network, where the data packets are communicated with a traffic function that operates independently of a billing function. Using a billing-function computing resource, which is separate and independent from a traffic-function computing resource that processes traffic related information, the billing data are filtered out, processed, stored and distributed, without competing with the traffic functions of the network. Two independent physical layer interfaces separately couple a communication link of the physical layer to the billing-function computing resource and traffic-function computing resource, respectively.

5 Claims, 2 Drawing Sheets

COLLECTING PER-PACKET BILLING DATA IN A PACKET DATA SERVICE

TECHNICAL FIELD

This invention generally relates to packet data services, and more particularly, to collecting billing data on a per-packet basis.

BACKGROUND

With the growing need for mobile data communications, which is driven by such factors as work place flexibility, connectivity, and time saving, subscribers are now requiring data services that were once offered exclusively by fixed data networks. The growth of mobile data service market is further fueled by the wide spread use of portable devices, which are equipped with radio access features that provide wireless connectivity for using mobile data services. For example, one such widely used service is an e-mail service that has become a necessity for many corporate and consumer users.

In some conventional mobile data networks, data access is provided via a circuit switched service. The circuit switched service, however, requires dedicated use of scarce radio resources during each session, even when no data is being communicated over a wireless link, such as an RF link. The requirement for such dedicated use arises mainly from long set up and signaling time required to connect and disconnect on a per-packet basis under the circuit switched arrangement. Because of limited radio resources, the network operators have been forced to bill subscribers for the duration of entire sessions without regard to the amount of data communicated over the RF link. This arrangement, however, has proven unsatisfactory both for the operators, who are required to dedicate their valuable radio resources for the entire length of sessions, and for subscribers who must pay for the entire duration of sessions, without regard to the volume of communicated data.

For billing purposes, most fixed Internet Protocol (IP) networks do not charge for usage on a per-packet basis. This is because procedures for collecting billing data on a per-packet basis require significant amount of computing capacity, with the benefits of collecting such billing data being outweigh by its complexity, specially in view of wide availability of fixed data bandwidth resources. As a result, conventional IP routers, that support billing functions, are designed with integrated traffic and billing computing resources. That is, the billing function and traffic function use the same computing resource.

In order to handle frequent traffic of small volumes of data or bursty traffic, such as those associated with browsing the Internet, packet switched networks are preferred for providing a mobile packet data service, which are defined by such standards as General Packet Radio Service (GPRS), CDPD and PPDC. Unlike the circuit switched data services, the mobile packet data services do not require dedicated use of the radio resources. For example, under the GPRS standard, each packet of data contains a destination address, providing for fast set up.

Consequently, under GPRS, CDPD and PPDC arrangements, collecting billing data on a per-packet basis has been incorporated into the corresponding standards, to allow operators to bill subscribers on a per-packet basis. Therefore, for a particular subscriber, the billing function of such mobile data service must account for each data packet handled by the traffic function, based on destination address, source address, size, etc. If the billing function and the traffic function are integrated, however, these functions end up competing for the use the same computing resource. Therefore, for a given traffic performance, a higher-end computing resource is required, if the billing and traffic functions use the same computing resource. Conversely, for a given computing resource, a lower traffic performance may be achieved, when the traffic function and billing function are integrated.

Accordingly, there exists a need to provide a simple and cost effective mobile data service that is capable of providing billing function on a per-packet basis, without adversely effecting the traffic function of the network.

SUMMARY

The present invention addresses the above need by separating the computing resource of the billing function from that of the traffic function.

The present invention provides billing data for a packet data network on a per-packet basis by performing the traffic function using a first computing resource that processes packet traffic related information. Under the invention, the physical layer over which the data packets are transported is used to retrieve all the data packets that provide the traffic related information. A billing data function uses a second computing resource, which is independent of the first computing resource, for generating billing data on a per-packet basis resource based on the retrieved data packets.

According to some of the more detailed features of the invention, the packet data network provides a mobile packet data service, for example, under a GPRS standard. Moreover, the physical layer of the preferred embodiment is an Ethernet physical layer.

DETAILED DESCRIPTION

Figure 1:
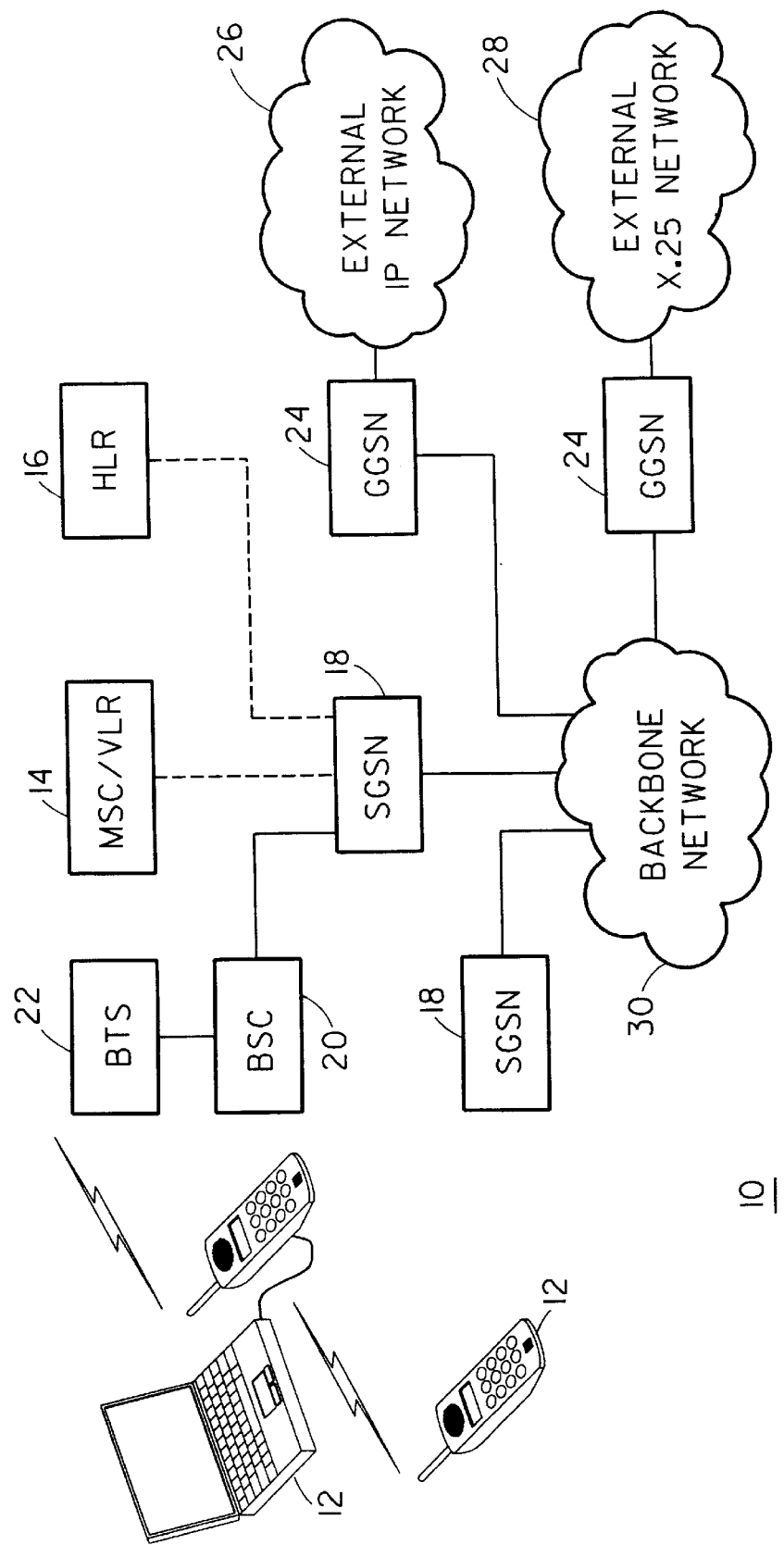
FIG. 1 is a block diagram of a communication system that advantageously incorporates the present invention.

Referring to FIG. 1, a block diagram of a communication system 10 that advantageously incorporates the present invention is shown. The communication system 10 is a GSM communication system, which provides wireless voice and data communication capability for a plurality of mobile stations 12. In an exemplary embodiment, the mobile data messaging service of the system 10 is provided by a GPRS defined standard, which allows for communicating data packets at a transmission rate of up to 115 Kbit/s. The GPRS hardware architecture deployed in the system 10 utilizes the existing GSM nodes, in addition to others, for supporting packet switching, and inter-working with existing packet data networks. The mobile stations 12 are also equipped to handle GPRS provided mobile packet data service, in addition to handling voice service. Examples of such mobile stations 12 include smart phones, Personal Digital Assistances (PDA), or portable computers, such as a lap tops, or palm tops that operate with or without a cellular telephone.

The mode of operation of GSM communication systems is described in European Telecommunication Standard Institute (ETSI) documents ETS 300 573, ETS 300 574 and ETS 300 578. Therefore, the operation of the system 10 is described only to the extent necessary for understanding the present invention. Although the present invention is described as embodied in a GSM system, those skilled in the art would appreciate that a wide variety of other communication systems, such as those based on PDC, AMPS, D-AMPS, UMTS, or CDMA standards, may also be utilized. Similarly, the mobile packet data service of the invention may be based on other standards, such as CDPD, PPDC or UMTS packet data.

According to the present invention, per-packet billing for a packet data network, mobile or fixed, is provided by retrieving and processing all packets transported at a physical layer of the network, where the data packets are communicated with a traffic function that operates independently of a billing function. Using a billing-function computing resource, which is separate and independent from a traffic-function computing resource that processes the traffic related information, the billing data are filtered out, processed, stored and distributed, without competing with the traffic functions of the network. Two independent physical layer interfaces separately couple a communication link of the physical layer to the billing-function computing resource and traffic-function computing resource, respectively. Under the arrangement of the invention, a first physical layer interface coupled to the billing-function computing resource is configured to listen and to retrieve every data packet sent over the communication link, and a second independent physical layer interface routes the traffic related information to the traffic function computing resource.

The system 10 is designed as a hierarchical network with multiple levels for managing calls and transmission of voice and packet data messages. At a higher hierarchical level, a Mobile Switching Center/Visitor Location Register (MSC/VLR) 14 is responsible for the routing of calls from an originator to a destination. In particular, the MSC/VLR 14 is responsible for setup, control, and termination of calls and broadcasting of the messages, with a VLR storing information about visiting mobile stations. The MSC/VLR 14 is also associated with a corresponding home location register (HLR) 16, which stores information relating to the mobile stations 12 belonging to a home MSC/VLR 14.

One or more logical nodes known as Serving GPRS Support Nodes (SGSN) 18 provide packet routing to and from service areas serving GPRS subscribers that are physically located within a corresponding service area. In this way, depending on their location, GPRS subscribers may be served by any one of the SGSNs 18 in the network. At a lower hierarchical level, each one of the SGSNs 18 are connected to corresponding base station controllers (BSC 20). The primary function of a BSC 20 is radio resource management. The BSC 20 also includes functionality for controlling the packet channels (PCU, packet control unit) as well as mobility management functionality for GPRS and handling of GPRS paging. Each BSC 20 controls one or more base transceiver stations (BTSs) 22, which primarily provide network air interface, through RF links, for transmission and reception of data bursts within a designated cell. Each BTS 22 also implements protocols supporting packet data for the air interface over the RF link.

Accordingly, in the system 10, the data traffic to the mobile stations 12 is routed from a SGSN 18 to a BTS 22 via a BCS 20. In addition, the SGSNs 18 perform authentication, ciphering and identification check, mobility management, and logical link management for the mobile stations 12. All subscription information in the system are handled by the HLR 16, which contains GPRS subscription data and routing information. Logical nodes known as Gateway GPRS Support Nodes (GGSN) 24 provide the interface with an external IP packet network 26 and a X.25 network 28. The GGSNs 24 include access functionality that interfaces external ISP functions like routers, DHCP and RADIUS servers, for security and billing purposes as well as dynamic allocation of IP addresses. The GGSNs 24 translate data formats, signaling protocols and address information in order to permit communication between different networks. From the external IP network 26's point of view, the GGSNs 24 are hosts owning all IP addresses of all subscribers served by the GPRS network. Functionality for routing to a suitable SGSN 18 and protocol conversion is provided by the GGSNs 24. The HLR 16, which is accessible from the SGSNs 18, also maps each subscriber to one or more of the GGSNs 24.

All of the nodes are interconnected via a backbone network 30, that in the exemplary embodiment is an Internet Protocol (IP) network. SGSN and GGSN functionalities may be combined in the same physical node, or each functionality may reside in different physical nodes. The SGSNs 18 and GGSNs 24, which incorporate GPRS backbone network protocol (IP) routing functionality, are interconnected with IP routers that incorporate packet data switches configured for providing per-packet billing data according to the present invention.

The GPRS network within the GSM system 10 offers a logical channel for packet transmission between the GGSNs 24 and the GPRS subscribers via the SGSNs 18, which, as described above, serve the geographical area within which the subscribers are located. In a well known manner, packet transmission between interconnected nodes within the system 10 takes place over a communication link by a defined physical layer, which functions according to one of a suitable number of networking standards.

Figure 2:
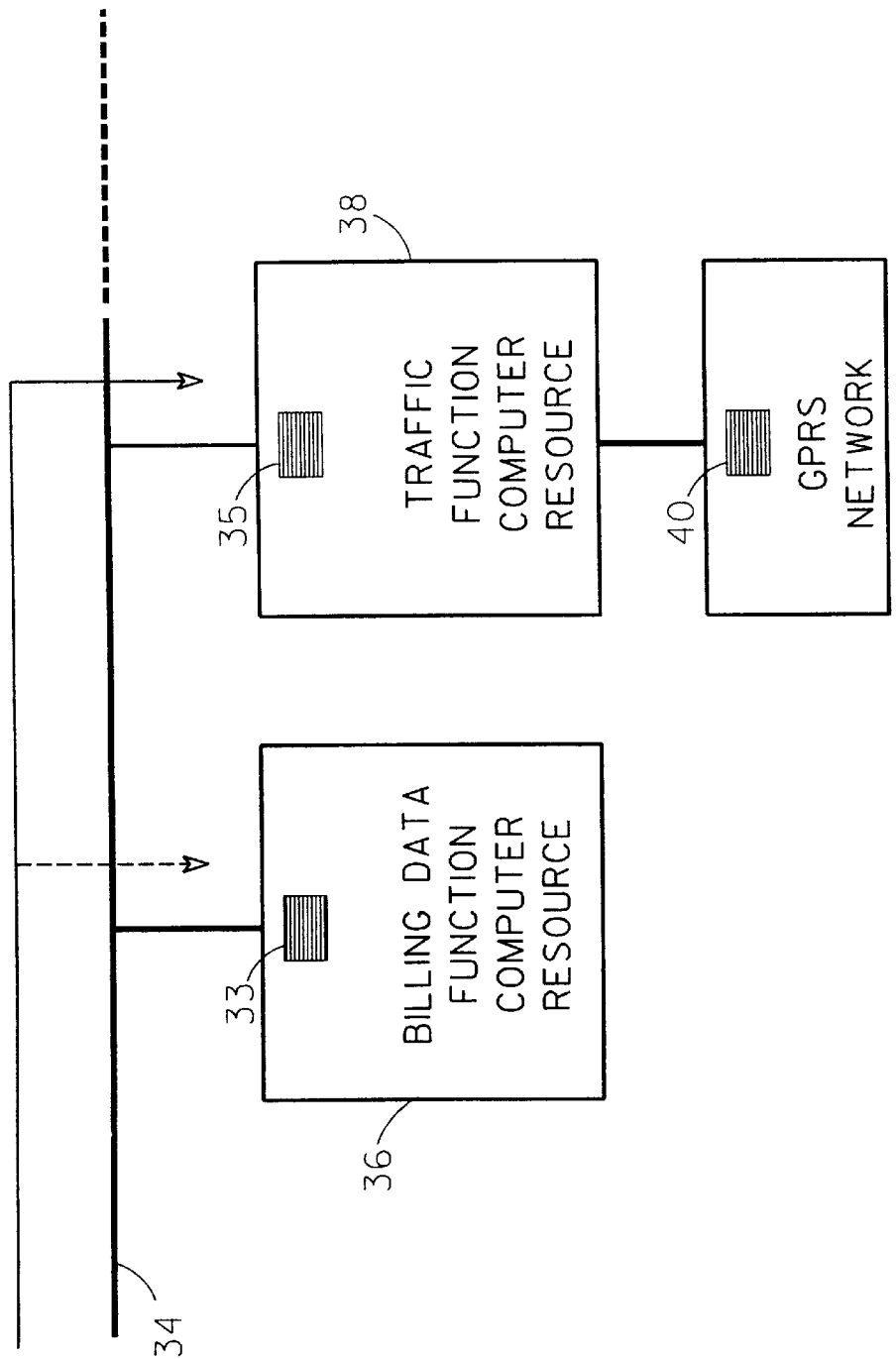
FIG. 2 is a block diagram of a packet data switch according to the present invention.

Referring to FIG. 2, a block diagram shows a physical packet transport layer over which data packets are transported in the packet data network of the invention. In the exemplary embodiment, the physical layer is based on a Ethernet LAN standard, such as a 10Base-T Ethernet LAN. Two independent Ethernet interfaces 33 and 35 couple a communication link 34 of the physical layer to a billing data function computing resource 36 and a traffic function computing resource 38. As shown, a first Ethernet interface 33 couples the communication link 34 to the billing data function computing resource, and a second separate Ethernet interface 35 couples the link 34 to the traffic function computing resource 38. A third interface 40 couples the traffic function computing resource to the rest of the GPRS network. Therefore, the present invention adds an independent computing resource with a separate Billing Data function to the same Ethernet physical layer as that used by the incoming and/or outgoing packets to the Traffic function computing resource 38.

Normally an Ethernet interface listens to every transported data packet over the communication, but it only retrieves the packets (or frames) addressed to its address or the packets that are part of a link broadcast or multi-cast message. The Ethernet interface 33, which is coupled to the billing-function computing resource, is modified to allow for retrieval of all packets on the communication link 34. In this way, the modified Ethernet interface 33 retrieves copies of all packets to and from the traffic function computing resource 38. The retrieved copies of all packets are processed by the billing-function computing resource 36, without the traffic-function computing resource 38 being effected or being even aware of it. Because the billing data function is configured to use a separate Ethernet or physical layer interface for the billing data distribution, the billing function under the present invention functions without putting any load on the Ethernet communication channel of the Traffic function.

From the foregoing description it would be appreciated that the billing function under the present invention does not use the same computing resource as the Traffic function, and thus, can be configured not to put any load on the Ethernet communication resources of the Traffic function. Furthermore, development of the Traffic function and the billing data function can be done in parallel by independent development teams, thus reducing time-to-market and cost. In this way, the billing function may also be marketed independently, as an option, for example.

What is claimed is:

1. A packet data network that provides billing data on a per-packet basis, comprising:

a network interface having a physical layer for transporting data packets over a communication link;

a first physical layer interface coupled to the communication link that provides traffic related information;

a traffic function computing resource that processes the traffic related information for forwarding over the packet data network;

a second layer interface that retrieves all of the data packets based on which the traffic related information is provided; and a billing-function computing resource coupled to the first physical layer that processes the retrieved data packets to provide billing data on a per-packet basis, independent and separate from the traffic function computing resource.

2. The packet data network of claim 1, wherein the packet data network is an IP network.

3. The packet data network of claim 1, wherein the packet data network provides a mobile packet data service.

4. The packet data network of claim 3, wherein the mobile packet data service is a GPRS service.

5. The packet data network of claim 1, wherein the physical layer is an Ethernet physical layer.

* * * * *